Patented Feb. 6, 1934

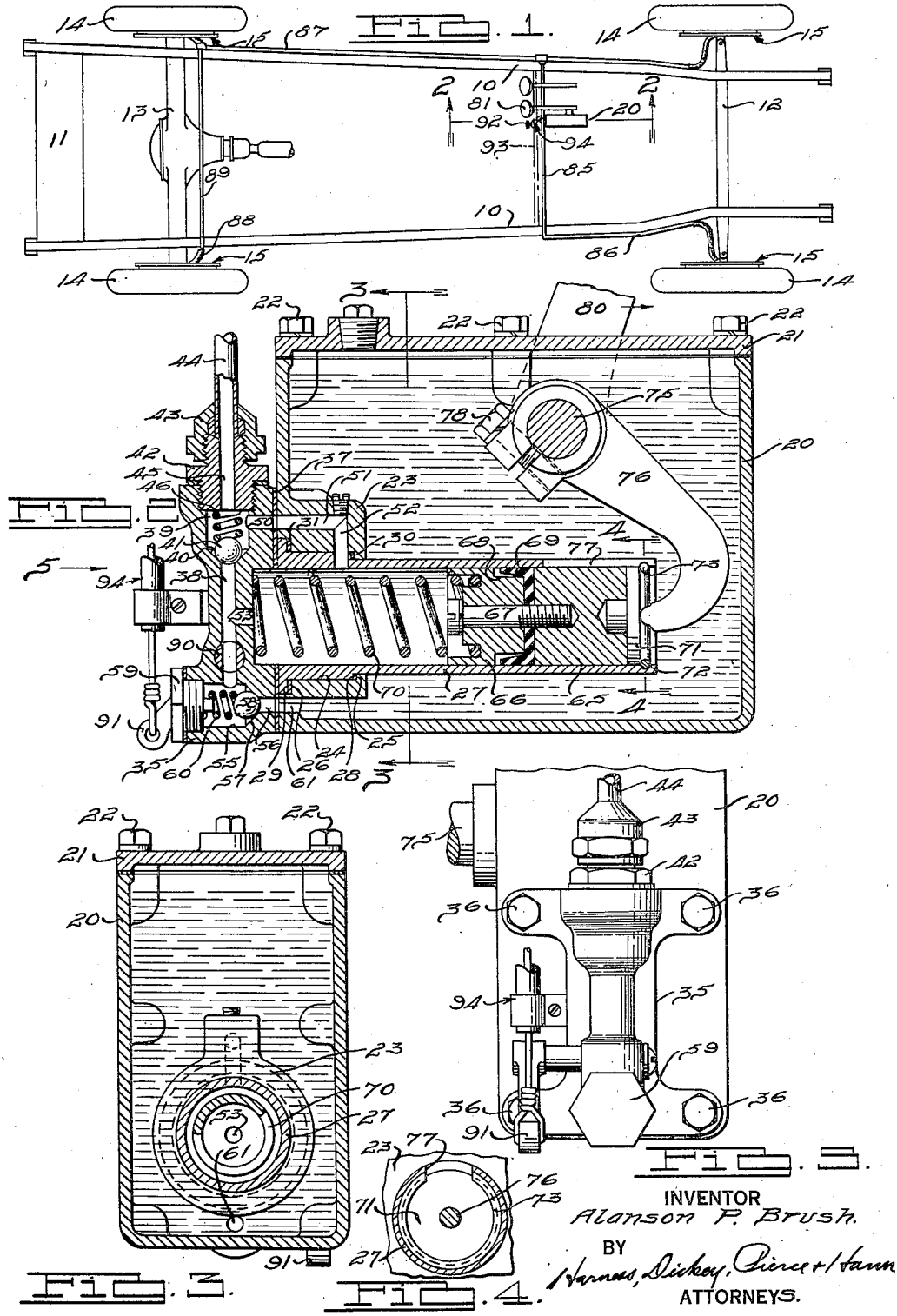
Feb. 6, 1934. A. P. BRUSH 1,945,728
HYDRAULIC BRAKE
Filed July 1, 1931
INVENTOR
Alanson P. Brush.
BY
Harness, Dickey, Pierce & Hamm
ATTORNEYS.

1,945,728

UNITED STATES PATENT OFFICE 1,945,728

HYDRAULIC BRAKE

Alanson P. Brush, Detroit, Mich.

Application July 1, 1931. Serial No. 548,136

5 Claims. (Cl. 60—54.6)

This invention relates to hydraulic brakes and particularly to a construction for the master cylinder thereof.

The principal objects of the present invention are to provide a master cylinder construction for hydraulic brake mechanisms in which automatic means are provided for maintaining the braking system properly filled with liquid at all times; to provide a braking system in which any deficiency of the volume of liquid therein will be automatically and positively compensated for on the next stroke of the brake pedal; to provide a brake construction in which any over travel of the brake pedal beyond its normal limit of movement automatically acts to replenish the volume of liquid in the system by an amount commensurate with the amount of such over travel of the brake pedal; to provide a construction of the class described in which any deficiency of liquid in the system necessary to cause a complete application of the brake with a normal amount of pedal travel is positively compensated for, regardless of the wear of the friction element of the brake or the spring pressure tending to hold such elements out of normal contact with their corresponding brake drum; to provide manually operable means for readily rendering the compensating means inoperative; and to provide a master cylinder construction for accomplishing the above result which is simple in construction, positive and efficient in operation and economical to manufacture.

Further objects of the invention include a master cylinder construction provided with a cylinder and cooperating piston, the cylinder having a discharge port intermediate its ends and adapted to be connected to the wheel brakes, and further provided with a bypass operatively connecting the closed end of the cylinder with the discharge port, the discharge passage being provided with a check valve permitting flow therethrough only from the direction of the cylinder, and the construction further including a passage connecting the cylinder with a liquid reservoir and including a check valve permitting the passage of liquid only from the reservoir to the cylinder.

In some forms of the invention the passage between the reservoir and the cylinder may include a manually operable shut-off valve, preferably operable from a position convenient to the driver of a vehicle including the system, for instance from the instrument board of such vehicle, whereby the passage between the reservoir and the cylinder may be positively blocked so as to render the compensating characteristics of the system either inoperative or operative at the will of the driver of the vehicle.

The above being among the objects of the present invention the same consists of certain features of construction and combinations of parts to be hereinafter described with reference to the accompanying drawing, and then claimed, having the above and other objects in view.

In the accompanying drawing which illustrates a suitable embodiment of the present invention and in which like numerals refer to like parts throughout the several different views:

Fig. 1 is a more-or-less diagrammatic plan view of an automobile chassis in which a suitable embodiment of the present invention is incorporated.

Fig. 2 is an enlarged vertical longitudinal sectional view taken centrally through a master cylinder construction embodying the present invention, as on the line 2—2 of Fig. 1.

Fig. 3 is a vertical sectional view taken transversely of the view in Fig. 2, and as on the line 3—3 of that figure.

Fig. 4 is a vertical sectional view taken transversely through the end of a cylinder shown in the previous views and upon the line 4—4 of Fig. 2.

Fig. 5 is a fragmentary elevational view of the master cylinder shown in the preceding views and looking from the left hand side thereof as viewed in Fig. 2.

As is well understood in the art of hydraulic brakes, the volume of liquid in the system must be replenished from time to time due to a number of different reasons. Leakages, usually of a minor character, commonly occur at the various joints and packings throughout the system, and the loss of liquid by reason of such leakages must necessarily be compensated for in order to maintain the brakes in their proper and efficient condition. Moreover, it is well understood that in any braking system, whether hydraulic or mechanical, it is desirable that the travel of the brake pedal, in order to fully set the brakes, does not exceed a certain desirable maximum travel. Heretofore, as far as I am aware, in all hydraulic braking systems heretofore proposed, any wear of the friction elements in the wheel brakes automatically increases the distance which the brake pedal has to be moved from inoperative position in order to fully set the brakes, and the only way of offsetting this increased pedal travel has been to readjust the normal inoperative position of the brake elements with respect to their cooperating drum. In other words, it has been necessary to reestablish a relatively close relation which existed between the friction elements and their cooperating drums before such wear occurred. Such readjustment necessarily involves the individual adjustment of each wheel brake, and necessarily involved considerable time, labor and expense.

I am aware that constructions have heretofore been suggested in which any loss of liquid in a hydraulic braking system due, for instance, to leakage, is automatically replaced, in some cases positively replaced, but as far as I am aware, in these previously suggested constructions the mechanism involved is, in most cases, too complicated for present day requirements of mass production and, furthermore, such constructions did not provide any means for maintaining the pedal travel constant at a desirable and predetermined distance, and consequently such constructions still necessitated the individual adjustment of the different wheel brakes in order to maintain the pedal travel within the desired maximum range of movement. Such previous constructions have included means for maintaining a predetermined pressure on the liquid within the system, in some cases up to as high as 8 or 10 pounds per square inch, but it will be obvious that such pressure could, in no case, be sufficiently great to overcome the force of the springs tending to hold the friction elements of the various wheel brakes in inoperative position, for otherwise the friction elements would be continuously maintained in contact with their cooperating brake drums.

The construction provided by the present invention not only includes all of the advantages of heretofore proposed constructions in that it automatically and positively compensates for any leakage of the liquid that may occur in the system, and this by an exceedingly and economical construction, but it further provides a means by which the normal pedal travel is maintained at a substantially constant value regardless of the amount of wear which occurs between the friction elements and the brake drum.

An illustrative embodiment of the present invention is shown in the accompanying drawing and in this embodiment, for the purpose of simplification, I have shown that type of master cylinder construction which is built in as a unit with a liquid reservoir, this being the form of construction which manufactures apparently favor, although it will be readily recognized by those familiar with the art that the construction is equally applicable to that type of hydraulic brake construction in which a liquid reservoir is formed separately from the master cylinder and supported remotely therefrom, for instance on the dash of the motor vehicle.

Referring to the drawing, and particularly to Fig. 1, an automobile chassis is shown more-or-less diagrammatically as including chassis frame side rails 10 connected together by one or more frame cross members 11. The front end rear axles, 12 and 13 respectively, are connected to the chassis frame in a conventional manner (not shown). Wheels 14 are carried at the opposite ends of the axles 12 and 13 and these wheels 14 have operatively associated therewith a wheel brake mechanism indicated generally as at 15, which may be of any conventional hydraulic brake construction, a number of different types of which are well known in the art and consequently no specific details of which are shown or considered necessary of explanation in connection with the present description, it being sufficient to understand that each brake mechanism includes a brake drum and associated friction element, spring means constantly urging the friction element out of contact with the drum, and a hydraulic cylinder or equivalent means associated with the friction element for moving it into contact with the drum in opposition to the spring means.

As previously explained the particular embodiment of the present invention herein shown is of that type in which the cylinder proper is embodied as part of a unit including an oil reservoir. This reservoir is indicated at 20, of rectangular box like form, and provided with a cover 21 secured thereto by screws such as 22. In its lower portion the rear wall of the reservoir 20 is provided with an inwardly extending integral projection or boss portion 23 provided with a stepped horizontal bore 24 therethrough providing radial faces or shoulders 25 and 26. Received in the bore 24 and guided and supported by the walls thereof is an open ended cylinder 27 externally formed to provide shoulders 28 and 29 complementary to the shoulders 25 and 26 respectively. Gaskets 30 and 31 are provided between these pairs of complementary shoulders in order to effectively seal the joint between the cylinder 27 and the boss 23 against leakage.

A casting 35 secured to the rear face of the reservoir 20 by screws such as 36 closes the rear end of the cylinder 27 and clamps it in position within the reservoir 20. A gasket 37 interposed between the casting 35 and the reservoir 20 serving to seal the joint between them against leakage.

The casting 36 is provided with a vertical central bore 38 enlarged at the upper end as at 39 to provide a valve seat 40 against which a ball valve 41 is received. A screw connection 42 threaded into the upper end of the enlarged bore portion 39 cooperates with a suitable nut member 43 for sealing the tube 44 to the connection 42, it being understood that the connection 42 is provided with a central bore 45 providing communication between the tube 44 and the bore 39. A coil spring 46, maintained under compression between the ball 41 and the adjacent end of the connection 42, constantly urges the ball 41 against the seat 40 whereby to positively close communication between the bores 38 and 39 in one direction. A lateral passage 50 in the casting 35 connects the bore 39 with the passage 51 in the boss 23, and the passage 51 in turn is connected with a passage 52 which extends through the side of the cylinder 27 at a point forwardly spaced from its rear end an appreciable amount which may be, for instance, equal to about one-half of the normal travel of the cylinder piston. A passage 53 connects the bore 38 with the end of the cylinder 27.

The passage 38 at its lower end communicates with the enlarged horizontal bore 55 in the casting 35 and which, in turn, communicates with the smaller horizontal passage 56, forming a valve seat 57 between them, and which valve seat receives the ball valve 58. The rear end of the bore 55 is closed by the screw plug 59 between which and the ball 58 a helical spring 60 is maintained under compression to constantly urge the ball 58 against the seat 57. The passage 56 communicates with the passage 61 in the rear wall of the reservoir 20 and which passage 61 leads into the lower portion of the reservoir.

A piston is slidably received in the cylinder 27 and in the particular embodiment shown this piston comprises two parts 65 and 66 secured together in axial alignment by a screw 67. The forward end of the section 66 is reduced in diameter as at 68 and a cup like packing member 69, of conventional construction, is clamped between the members 66 and 65, the lip of the cup being received in the annular channel formed by the cut away portion 68 and being free to flex therein. The particular reason for this form of piston construction is to eliminate possibility of the cup packing 69 from coming in contact with the edges of the port formed by the passage 52 where it enters the cylinder 27, upon an over travel of the piston, as will hereinafter be more fully explained. A coil spring 70 is maintained under compression between the rear face of the piston and the forward face of the casting 35, the adjacent faces of the piston and the casting being shown as recessed for the purpose of allowing greater range of movement for the spring 70, this feature, of course, being optional. The forward face of the portion 65 of the piston is shown as being provided with a hardened button member 71 of a diameter substantially equal to that of the piston, and the forward end of the cylinder 27 is provided with an internal circumferential groove 72 in which a split wire ring 73 is sprung, thereby to act as a stop for the piston in its forward movement and as urged by the force of the spring 70.

A rock shaft 75 extending horizontally through a side of the reservoir 20 has secured thereto internally of the reservoir 20 a curved arm 76, the free end of which is adapted to bear against the button 71 at the forward end of the piston. The upper wall of the cylinder 27 is preferably slotted as at 77 a sufficient distance to permit the arm 76 to move through it in advancing the piston to the limit of its stroke. The arm 76 may be secured to the rock shaft 75 by means of the clamping screw 78 or any other suitable means. Externally of the reservoir 20 the rock shaft 75 may be operated in any suitable manner from a brake pedal, the particular embodiment shown, for the sake of simplicity, indicating that the rock shaft has directly secured thereto the brake pedal 80 which extends upwardly and then rearwardly from the rock shaft 75 and terminates at its upper end in a conventional pedal pad 81, indicated in Fig. 1.

It will be understood that, in accordance with conventional practice, the reservoir 20 is at least partially filled with a suitable liquid forming the actuating medium for the braking system, and that the tube 44 is connected to additional tubes such as 85, 86, 87, 88 and 89 which extend to the various wheel brakes 15, and which tubing may be of any conventional construction. It will also be understood that when the brake is not being applied the spring 70, together with the springs in the wheel brakes normally urging the brakes to inoperative position and consequently urging the liquid therein back into the cylinder 27, maintain the piston in its forwardmost position, and consequently the brake pad 81 in its rearmost position.

When it is desired to apply the brakes the pressure is applied to the pedal pad 81 to move it forwardly, thus rotating the rock shaft 75 and the arm 76 in a clockwise direction as viewed in Fig. 2, the free end of the arm 76 moving rearwardly and causing the piston to move rearwardly in the cylinder 27 against the force of the spring 70. This rearward movement of the piston in the cylinder 27 acts to displace the liquid trapped between the rear face of the piston and the casting 35 and, because of the fact that the passages 50, 51 and 52 offer less resistance to the passage of this liquid to the bore 39, and consequently through the tube 44 to the wheel brakes 15, than does the passages 53 and 38, because of the spring pressed ball 41, such liquid as it is displaced will flow through the former passages until such time as the rear piston portion 66 in moving rearwardly cuts off communication between the cylinder and the passage 52.

Now it will be apparent that as soon as the piston portion 66 cuts off communications between the cylinder 27 and the passages 52, any further rearward movement of the piston 66, in displacing liquid from the cylinder 27, will force such liquid out through the passage 53 into the bore 38. Inasmuch as communication between the bore 38 and the liquid in the reservoir through the passages 55, 56 and 61 is blocked against the flow into the reservoir, by the ball valve 58, the only escape for such liquid in the passage 38 is past the ball valve 41 into the bore 49 and thence into the tube 44, the ball valve 41 lifting against the force of the spring 46 to permit such flow.

It is important to observe that after the piston has advanced rearwardly of the passage 52 and has displaced liquid from the cylinder rearwardly of the passage 52, when pressure on the pedal pad 81 is released and the piston is urged forwardly by the spring forces heretofore mentioned, it will not be possible for any liquid from the braking system outside of the reservoir 20 to flow back into the cylinder 27 until the rear edge of the piston has moved forwardly a sufficient amount to uncover the passage 52, this being for the reason that the ball valve 41 closes the passage 38 to a flow of the liquid therethrough from the bore 39, and the piston seals the passage 52 against flow to the cylinder 27. Accordingly the suction created between the rear face of the piston and the casting 35 will cause sufficient force to be exerted to lift the ball valve 58 and permit liquid from the reservoir 20 to flow through the passages 61 and 56 into the bore 55 and thence through the bore 38 and bore 53 into the cylinder 27 until the piston begins to uncover the passage 52. As soon as this occurs, then the liquid from the braking system, outside of the reservoir 20, will be permitted to return into the cylinder 27 through the passages 50, 51 and 52.

From the above it will be apparent that whenever the piston in the cylinder 27 is moved to a position rearwardly of the passage 52, a positive displacement of liquid from the cylinder rearwardly of the passage 52 will occur, and any such liquid that is thus displaced is returned to the cylinder 27 on the succeeding return stroke of the piston, from the reservoir 20. Thus a positive means is provided for pumping liquid from the reservoir 20 into the braking system.

In practice the device described is designed so that movement of the pedal pad 81 from its normal inoperative position to its normal maximum displaced position is sufficient to bring the rear edge of the piston portion 66 up to the rear edge of the passage 52 where it enters the cylinder 27. Thus it will be apparent that should any leakage occur in the braking system, outside of the reservoir 20, an abnormal or excessive travel of the pedal pad 81 will occur on the next full depression of the pedal, and this will automatically act to replenish the system by the amount of liquid which has thus leaked out. However, as soon as such replacement of liquid has been made, assuming that in such stroke of the piston the pedal pad 81 has been depressed sufficiently to bring the friction elements in the wheel brakes into firm and complete engagement with their respective brake drums, upon the succeeding operating stroke of the pedal it will only be necessary for the piston in the cylinder 27 to travel an amount sufficient to bring the rear edge of the piston portion 66 into alignment with the rear edge of the passage 52 where it enters the cylinder 27, in order to effect the same and identical firm engagement of the brake elements with their corresponding brake drums and no further rearward movement of the piston will be capable of occurring. This feature automatically guards against any possibility of the liquid replenishing mechanism from pumping an excessive amount of liquid into the brake system, and is positive in operation in this respect.

For the same reason it will be apparent that as the friction facing of the brake element wears in service, thus necessitating a greater amount of movement on the part of the individual brake expanding cylinders in the wheel brakes, such additional movement of these individual cylinders will call for an increased displacement of liquid in the master cylinder in order to effect a complete engagement of the friction elements with their respective brake drums. This increased displacement in the master cylinder can only be effected by a travel of the piston in the cylinder 27 beyond the rear edge of the passage 52 where it enters the cylinder, with consequent and positive additional supply of liquid being forced into the master cylinder on the succeeding return stroke of the master cylinder piston. However, inasmuch as the piston in the master cylinder cannot return beyond a predetermined point in the master cylinder, it will be apparent that an apparent excess of liquid will thus have been forced into the braking system and which will prevent the friction elements in the wheel brakes from receding from their respective brake drums more than a predetermined amount. Consequently, any wear that may have occurred in the surface of these friction elements is thus automatically compensated for so that, on the next operative stroke of the piston in the master cylinder, assuming that no leakage has occurred in the system in the meantime, the piston will travel only as far as the point where the passage 52 enters the cylinder 27. It will thus be recognized that where the amount of leakage in the system is not materially in excess of that which normally occurs in such system, any over travel of the piston in the cylinder 27 beyond the passage 52 will be comparatively rare, or at least only an occasional occurrence, and consequently the maximum normal amount of pedal travel will be maintained at a substantially constant figure throughout the life of the brakes. It will also be apparent that the mechanism for obtaining this result is extremely simple and positive in operation.

Occasions may arise in service or elsewhere wherein it is desirable to temporarily render the automatic compensating mechanism heretofore described either operative or inoperative. Where such is the case it may be conveniently accomplished by the provision of a shut-off valve such as 90, for instance in the casting 35 and in connection with the passage 38, the shut-off valve 90 being provided with an operating arm or lever 91. Where control of the valve 90 convenient to the driver of the vehicle is desired, an operating button such as 92 (see Fig. 1) mounted upon the instrument board 93 may be provided, the button 92 being connected to the arm 91 by means of a conventional Bowden wire structure indicated generally as at 94 and too well known in the art to require further description.

Although one specific embodiment of the present invention has been shown and described in connection herewith, it will be apparent to those skilled in the art that the features of the invention may be incorporated in radically different forms of construction, and it is to be understood that formal changes may be made in the specific embodiment of the invention described without departing from the spirit or substance of the broad invention, the scope of which is commensurate with the appended claims.

What I claim is:

1. In a hydraulic braking system, in combination, a master cylinder, a piston reciprocable therein, said system including a main passage connecting said cylinder with said system, a second passage connecting said cylinder with said system, and a third passage connecting said cylinder with a reserve source of liquid supply, and means in said second and third passages permitting flow of liquid therethrough in a predetermined direction only.

2. In a hydraulic braking system, in combination, a master cylinder, a piston reciprocable therein, said system including a main passage connecting said cylinder with said system, an auxiliary passage connecting said cylinder with said system, and a third passage connecting said cylinder with a reserve source of liquid supply, a check valve in said auxiliary passage permitting flow of liquid therethrough in the direction from said cylinder to said system only, and a check valve in said third passage permitting flow of liquid therethrough from said reservoir to said cylinder only.

3. In a hydraulic braking system, in combination, a master cylinder and a piston reciprocable therein, said system including a main discharge passage communicating with said cylinder intermediate the ends thereof, an auxiliary discharge passage connected to said main discharge passage and substantially operative only upon overtravel of said piston beyond its point of connection with said main discharge passage to conduct fluid from said cylinder to said system, means in said auxiliary passage permitting flow of fluid therethrough from said cylinder only, a fluid reservoir, a duct connecting said reservoir with said system, and means in said duct permitting flow of fluid therein away from said reservoir only, whereby upon return movement of said piston from said over-travel fluid will be drawn into said system from said reservoir.

4. In a hydraulic braking system, in combination, a cylinder and a piston reciprocable therein, said cylinder being provided with a pair of axially spaced discharge ports for the escape of liquid therefrom into said braking system for the purpose of applying the brakes, constantly operative means in one of said passages limiting flow of liquid therethrough in one direction only and means effective by a suction set up in said cylinder during return of said piston to normal position after an actuating movement in excess of its normal travel for delivering additional liquids into said cylinder.

5. In a hydraulic braking system, in combination, a master cylinder device including a cylinder, a piston reciprocable therein, a main duct and an auxiliary duct connecting said cylinder with said system, a source of liquid supply connected with said cylinder, and means in said auxiliary duct and in the connection between said cylinder and said source for causing liquid to be sucked into said system from said source, without applying the force of said suction to said system, upon the return movement of said piston from a position beyond its normal maximum stroke.

ALANSON P. BRUSH.